3,254,050
TETRAHALO BISPHENOL BISPHOSPHITES AS HEAT STABILIZERS AND FLAME RETARDANTS IN RESINS
Charles F. Baranauckas and Irving Gordon, Niagara Falls, N.Y., assignors to Hooker Chemical Corporation, Niagara Falls, N.Y., a corporation of New York
No Drawing. Filed Oct. 31, 1961, Ser. No. 148,831
11 Claims. (Cl. 260—45.7)

This invention relates to new compositions of matter and their methods of manufacture. More specifically, the inventive concept of the present invention resides in the novel production and structure of various bisphosphites.

The compounds of this invention can be represented by the following general formula:

$$\begin{array}{ccc} Cl & CH_3 & Cl \\ | & | & | \\ P-O-Ar-C-Ar-O-P \\ | & | & | \\ Cl & CH_3 & Cl \end{array}$$

wherein Ar is an aromatic nucleus.

The compounds of this invention have exhibited valuable utility as heat stabilizers for vinyl and other type resins, and also as flame retardants for other polymer compositions.

The novel method of preparing the compounds of this invention is illustrated by the following equations:

$$2PCl_3 + HO-Ar-\underset{\underset{CH_3}{|}}{\overset{\overset{CH_3}{|}}{C}}-Ar-OH \xrightarrow{PCl_3 \text{ in excess}}$$

$$2HCl + \begin{array}{ccc} Cl & CH_3 & Cl \\ | & | & | \\ P-O-Ar-C-Ar-O-P \\ | & | & | \\ Cl & CH_3 & Cl \end{array}$$

where Ar is an aromatic nucleus and the chlorine may be substituted by another halogen.

Some of the bisphenols that may be used in place of the bisphenol A

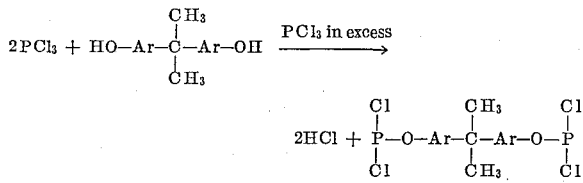

of this invention are bisphenol B
(4,4′-sec-butylidenediphenol), bisphenol F(4,4′-methylidenediphenol);
2,4-methylidene diphenol;
2,2′-methylidenediphenol;
2,4-ethylidenediphenol;
4,4′-propylidene diphenol;
2,2′-propylidenediphenol;
2,4-propylidene diphenol;
4,4′-3-pentylidenediphenol;
4,4′,2,2′, or 2,4,2-hexylidenediphenol;
4,4′,2,2′-, or 2,4,3-heptylidenediphenol;
4,4′,2,2′, or 2,4,1,1,1-trichloro-2-ethylidenediphenol;
4,4′,2,2′, or 2,4-phenylmethylidene diphenol;
4,4′,2,2′, or 2,4-vinylmethylidenediphenol;
4,4′,2,2′, or 2,4-diphenylmethylidene diphenol;

and the like. Generally the bisphenols that may be used in the process in place of the bisphenol A of this invention can be illustrated as follows:

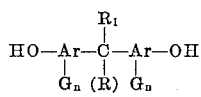

wherein Ar is an aromatic nucleus, R and R′ are organo groups or alkyl, aryl, heteroaryl, alkaryl, cycloalkyl and the like, G is alkyl, halogen, nitro, or other substituents; $n$ is a numerical value from zero to four.

The compositions of this invention are prepared by the reaction of $PCl_3$ plus bisphenol-A. Other useful compositions may be manufactured if this reaction is followed by the reaction of the resultant acid chloride with a phenol or substituted phenol. Thus, the compositions of this invention are not only useful as flame retardants, or heat stabilizers, but are also useful as intermediates for the production of further useful compositions. For example, useful bisphosphites can be prepared via the compositions of this invention as follows:

EXAMPLE 1

Bisphenol-A (one mole), was slowly added to the $PCl_3$ (ten moles) maintained at a temperature of seventy degrees centigrade with vigorous stirring. A slight nitrogen ($N_2$) ebullition was employed to disengage the hydrogen chloride (HCl) of reaction. The reaction mixture was held at seventy to eighty degrees centigrade throughout the addition period (one hour for a one mole bisphenol-A run). A final reaction period of one hour at eighty degrees centigrade with nitrogen ($N_2$) ebullition was used to complete the hydrogen chloride (HCl) evolution. Diluent toluene was added equal to one-half weight of the starting $PCl_3$. The excess $PCl_3$ and toluene were vacuum distilled using a small Vigreaux column (< three plates), at ultimate conditions of a port temperature of seventy-five degrees centigrade at ten millimeters. The novel composition tetrachloro bisphenol A-bisphosphite used as an intermediate was obtained in nearly theoretical yield (one mole).

The use of this composition as an intermediate in producing further bisphosphites is as follows:

This intermediate tetrachloro bisphenol A-bisphosphite was dissolved in half its weight of toluene and added to the appropriate phenol (four moles) dissolved in half its weight of toluene and held at eighty degrees centigrade. Vigorous stirring and nitrogen ebullition were used. After the addition period (one hour for a one mole reaction), a one hour finishing period at one hundred degrees centigrade was used to complete the HCl evolution. The toluene diluent was vacuum distilled at ultimate conditions of pot temperature of eighty degrees centigrade at ten millimeters. The product, a tetraphenyl-bisphenol-A-bisphosphite, a viscous liquid, was obtained in nearly quantitative yield and was mixed with filter aid and filtered before packing.

Using the above preferred procedure, the conditions thereof were modified accordingly to determine working ranges within which the present process will function. While the above conditions are preferred, it was found that satisfactory results were obtained within certain ranges. It was found that the bisphenol-A-$PCl_3$ mixture may be held at a temperature of from about twenty-five to eighty degrees centigrade during the addition of the $PCl_3$. The reaction was held at from about twenty-five to about eighty degrees centigrade throughout the addition period. The final reaction period was from about one-half to five hours at from about twenty-five to about eighty degrees centigrade. In place of the preferred toluene, other conventional diluents as benzene, xylene, petroleum ether, and the like, may be used in an amount equal to from one-tenth to ten times the weight of the starting $PCl_3$. The intermediate bis(dichlorophosphite) of this invention was dissolved in from about one-quarter to four times its weight of toluene and held at from about twenty-five to eighty degrees centigrade. After the addition period, a one-half to two hour finishing period at about from twenty-five to one hundred degrees centigrade was used to complete the HCl evolution. While in the above preferred method a near quantitative yield of the product resulted, the ranges specified herein gave better than average yields.

The general equation for the above procedure would be as follows:

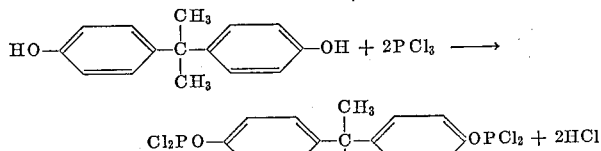
(1)

Use of composition of this invention as an intermediate:

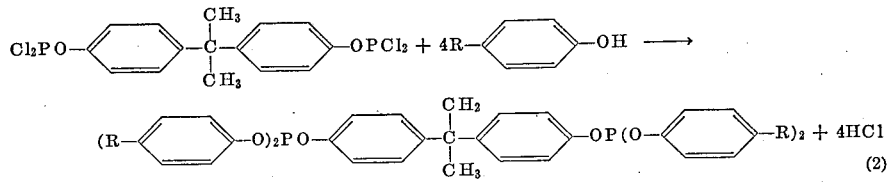
(2)

Equation 1 represents the reaction of two moles of phosphorus trichloride with one mole of bisphenol-A to effect the corresponding novel tetrachloro bisphenol-A-bisphosphite of this invention.

Equation 2 represents the reaction of the chlorophosphite with phenol or an alkylated phenol to form the corresponding novel tetraphenyl or tetra-alkyl phenyl bisphenol-A-bisphosphite, which is subject matter of a copending application.

EXAMPLE 2

The final product compositions prepared and disclosed above have extremely desirable utility as a stabilizer for vinyl resins and other resin systems.

*Utility examples of the compositions made via the compositions of this invention*

All the stability tests were effected using the following basic formulation:

Fifty grams polyvinyl chloride
22.5 grams di-2-ethylhexyl phthalate
One gram barium cadmium laurate
(Approximately 0.018 gram of P contained in the phosphite or phosphorus compound to be tested.)

*Bisphenol bisphosphites*

0.19 gram tetraphenyl-bisphenol-A-bisphosphite

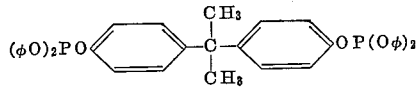

or 0.26 gram tetra-t-butylphenyl bisphenol-A-bisphosphite

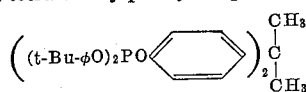

or 0.28 gram tetra-octyl phenyl bisphenol-A-bisphosphite

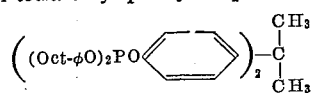

or 0.33 gram tetra-nonyl phenyl bisphenol-A-bisphosphite

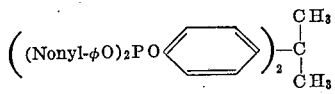

*Preparation of sample for test*

The sample of the bisphosphite to be tested was weighed and dissolved directly into the di-2-ethylhexyl phthalate. The barium cadmium laurate and the polyvinyl chloride were now added and mixed in. Controls were made up at the same time which contained no phosphorus compounds.

*Milling the test sample*

The above mixtures were now milled on a small rubber mill set at three hundred degrees Fahrenheit with a mixing time of about three minutes, and a milling time of about five minutes. A polyvinyl chloride film of about forty-five mils thickness is produced.

*Heating (accelerated aging test)*

The milled sheets were cut into three-quarter inch by one and one-quarter inch rectangles, placed on a four by four inch glass plate, and placed in a three hundred and fifty degree Fahrenheit oven. Samples (plate by plate) were removed from the oven at fifteen minute intervals up to one hundred and fifty minutes. The cooled samples were then examined and visual comparison of color development were made. Lack of color development is a measure of stabilizing efficiency.

*Interpretation*

An examination of the table below indicates the utility of these bisphenol bisphosphites (isoalkylidene bis) (o- or p-substituted aryl) tetra(substituted phenyl)diphosphites, as vinyl stabilizers. The controls (containing no phosphorous additives) were spotted after forty-five minutes and black thereafter, whereas the bisphenol bisphosphite treated vinyl strips were colorless until about one hundred and twenty to one hundred and fifty minutes, when they spotted. In addition, the tetraphenyl bisphenol-A-bisphosphite treated vinyl strip was only spotted at one hundred and fifty minutes—it never blackened. Results of Accelerated Aging Test (X minutes at 350 degrees Fahrenheit).

| Sample | Minutes to Spotting | Minutes to Blackening |
|---|---|---|
| Control | 45 | 90 |
| Tetraphenyl Bisphenol-A-Bisphosphite | 150 | >150 |
| Tetra-tert-butyl phenyl bisphenol-A Bisphosphite | 120 | 150 |
| Tetra-octyl-phenyl bisphenol-A-Bisphosphite | 120 | 150 |
| Tetra-nonyl phenyl Bisphenol-A-Bisphosphite | 120 | 150 |

EXAMPLE 3

*Utility examples for the tetrachloro-bisphenol-A-bisphosphite compositions of this invention*

The product composition of this invention has desirable utility as a stabilizer for vinyl resins and other resin systems.

All the stability tests were effected using the following basic formulation:

50 grams polyvinyl chloride
22.5 grams di-2-ethylhexyl phthalate
1 gram barium cadmium laurate
.13 gram tetrachloro-bisphenol-A-bisphosphite

*Preparation of samples for test*

The sample of tetrachloro-bisphenol-A-bisphosphite was weighed and dissolved directly into the di-2-ethylhexyl phthalate. The barium cadmium laurate and the polyvinyl chloride were now added and mixed in. Controls were made up at the same time which contained no phosphorous compounds.

Milling the test samples

The above mixtures were now milled on a small rubber mill set at three hundred degrees Fahrenheit, with a mixing time of about three minutes, and a milling time of about five minutes. A polyvinyl chloride film of about forty-five mils thickness is produced.

Heating (accelerated aging test)

The milled sheets were cut into three-quarter inch by one and one-quarter inch rectangles, placed on a four by four inch glass slate, and the slates were placed in a three-hundred-and-fifty degree Fahrenheit oven. Samples (plate by plate) were removed from the oven at fifteen minute intervals for a few periods after complete blackening of all test samples. The cooled samples were then examined and visual comparison of color development were made. Lack of color development is a measure of stabilizing efficiency.

Interpretation

A visual comparison of color development indicated the utility of the product composition of this invention, tetrachlorobisphenol-A-bisphosphite, as a vinyl stabilizer.

The controls (containing no phosphorus additives) were spotted after forty-five minutes, and black thereafter, whereas the tetrachloro-bisphenol-A-bisphosphite treated samples lasted thirty minutes longer than the controls before spotting or blackening.

EXAMPLE 4

The product composition of this invention has desirable utility as a flame-retarding additive in polyurethane foams and other resin systems.

The polyurethane foams were prepared using the following basic formulation:
100 parts of a 1,4,5,6,7,7-hexachlorobicyclo(2.2.1)-5-heptene-2,3-dicarboxylic anhydride polyester
70 parts of toluene diisocyanate
28 parts of trichlorofluoromethane
0.7 part of 1,4-diazobicyclo(2.2.2)-octane The above ingredients were mixed rapidly, poured into a cardboard container, and allowed to foam completely (ten minutes), at room temperature. The resulting polyurethane foam was then cured at eighty degrees centigrade for thirty minutes, effecting a hard, polyurethane foam of uniform cell size.

The above basic formulation was modified by the addition of ten parts of tetrachloro-bisphenol-A-bisphosphite.

The polyurethane foam containing the product composition (the test foam) was prepared and cured in a similar fashion to the above control.

The test foams had comparative physical properties to the control foams. In addition, flame-retardance tests indicated that substantial flame retardance had been conferred on the polyurethane foams by the addition of the product composition of the invention, tetrachloro-bisphenol-A-bisphosphite.

Also the Underwriters Laboratory Test #484 in which a piece of the foam is subjected to a flame and which requires that the test sample must show flame extinguishment before sixty-one seconds have elapsed with no more than two and one-quarter inches of the test foam sample burned away, showed that the entire specimen of the control was consumed by flame in one hundred and thirty-eight seconds, whereas the test sample containing the product composition of the invention extinguished itself in forty-four seconds with only one inch of the test polyurethane foam sample being consumed. Therefore, this test shows conclusively that tetrachloro-bisphenol-A-bisphosphite is an effective flame retardant in polyurethane foams.

EXAMPLE 5

Another example of the utility of the product composition of this invention in polyurethane foams is described below.

The rigid polyurethane foams were prepared using the following basic formulation:

(1) 100 parts of a condensation polymer prepared from ten moles of trimethylol propane and six moles of adipic acid.
(2) 122 parts of a mixture of 24.8 parts of the above-described trimethylol propane polyester and 97.6 parts of toluene diisocyanate.
(3) 0.7 part of dibutyltin dilaurate.
(4) 28 parts of trichlorofluoromethane.

The above ingredients were mixed, foamed, and cured in a similar fashion to that of Example 4, effecting a hard, white polyurethane foam of uniform cell size.

The above basic formulation was modified by the addition of twenty-three parts of tetrachloro-bisphenol-A-bisphosphite, and by the use of thirty-five parts instead of twenty-eight parts of trichlorofluoromethane.

The polyurethane foam containing the product composition (the test foam) was prepared and cured in a similar fashion to the above control foam.

Flame-retardance tests indicated that substantial flame retardance had been conferred on the polyurethane foams of this example by the addition of the product composition of this invention, tetrachloro-bisphenol-A-bisphosphite.

EXAMPLE 6

The product composition of this invention has desirable utility as a flame-retarding additive in polyacrylates, polyacrylate systems, and other resins systems.

The polyacrylates were prepared using the following basic formulation:

100 parts of methyl methacrylate or a partially polymerized methyl methacrylate (acrylate syrup).
One part of benzoyl peroxide.

The above basic formulation, called hereafter the "control sample," was modified by the addition of fifteen parts of tetrachloro-bisphenol-A-bisphosphite, the sum total of the ingredients containing the said product composition of this invention, called hereafter the "test sample."

The above ingredients in both the control and test samples were mixed and placed in a heating bath at one hundred degrees centigrade for one to two hours.

A hard, rigid polymeric casting was obtained for both the control and test samples.

Flame-retardance tests indicated that substantial flame retardance had been conferred on the polyacrylates of the above example by the addition of the product composition of this invention, tetrachloro-bisphenol-A-bisphosphite.

EXAMPLE 7

The product composition of this invention also has desirable utility as a flame-retarding agent in polystyrenes, polystyrene systems, and other resin systems.

The polystyrenes were prepared as described in Example 6 for the polyacrylates with the substitution of styrene monomer for the methyl methacrylate, styrene syrup for the acrylate syrup, and ten parts of the tetra-chloro-bisphenol-A-bisphosphite for the parts of said product composition of Example 6.

Flame-retardance tests indicated that substantial flame retardance had been conferred on the polystyrenes of this example by the addition of the product composition of this invention, tetrachloro-bisphenol-A-bisphosphite.

Although this invention has been illustrated and defined herein in terms of the above examples, it is to be understood that these are by no means all inclusive. Various modifications to the invention herein set forth will suggest themselves to those skilled in the art. These are intended to be comprehended within the spirit of this invention.

We claim.
1. The composition having the general formula:

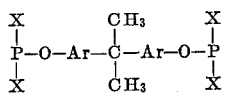

where Ar is an aromatic carbocyclic nucleus and X is a halogen.
2. The composition of claim 1 where Ar is phenylene.
3. The composition of claim 1 where X is chlorine.
4. The composition of claim 2 where X is chlorine.
5. A method for the production of the composition of claim 1 which comprises contacting a composition having the formula $PX_3$ with a composition having the formula:

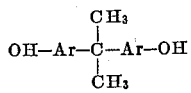

where Ar is an aromatic carbocyclic nucleus, and X is a halogen, the molar proportion of $PX_3$ to

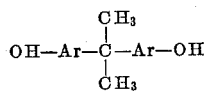

being in excess of 2.
6. The method of claim 5 wherein the molar excess of $PX_3$ is such that the molar ratio of $PX_3$ to

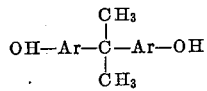

is up to about 10.
7. The method of claim 6 wherein the $PX_3$ is $PCl_3$, the temperature is from about 25 to 100 degrees centigrade and the excess $PX_3$ is removed after the formation of said resulting composition.
8. A resin of improved heat stability properties comprising an effective minor proportion of a composition of formula

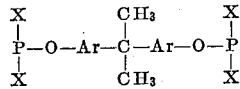

where Ar is an aromatic carbocyclic nucleus and X is a halogen, distributed throughout a resinous material to improve the heat stability properties thereof.
9. A resin of improved heat stability properties comprising an effective minor proportion, about 0.2 to 13 percent by weight of a composition of formula

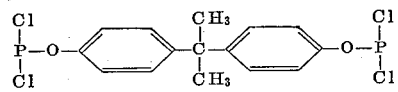

distributed throughout a resinous material to improve the heat stability properties thereof.
10. A polyurethane having improved flame retardant properties comprising said polyurethane and an effective flame retardent minor proportion of a composition of the formula

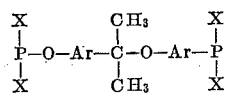

where Ar is an aromatic carbocyclic nucleus and X is a halogen.
11. A resin of improved heat stability properties comprising a vinyl resin and a stabilizing effective proportion, about 0.2 percent by weight of a composition having the formula

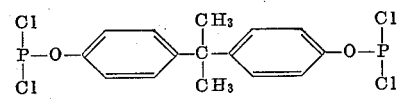

References Cited by the Examiner

UNITED STATES PATENTS 2,234,379   3/1941   Martin _____ 260—45.7
2,520,090   8/1950   Barrett _____ 260—461.303
2,643,265   6/1953   Fon Toy _____ 260—461.303

LEON J. BERCOVITZ, *Primary Examiner.*

MILTON STERMAN, *Examiner.*

J. W. BEHRINGER, M. J. WELSH, *Assistant Examiners.*